United States Patent [19]

Koester et al.

[11] 4,073,977

[45] Feb. 14, 1978

[54] STABILIZATION OF PYROPHORIC METAL POWDERS WITH ALKYLENE OXIDE POLYMERS

[75] Inventors: Eberhard Koester, Frankenthal; Gerd Wunsch, Speyer; Eduard Schoenafinger, Ludwigshafen; Hans Henning Schneehage, Mutterstadt, all of Germany

[73] Assignee: BASF Aktiengesellschaft, Ludwigshafen, Germany

[21] Appl. No.: 691,227

[22] Filed: June 1, 1976

[30] Foreign Application Priority Data

Aug. 7, 1975 Germany ............................ 2535277

[51] Int. Cl.$^{2}$ ......................... B05D 7/00; C04B 31/40

[52] U.S. Cl. ................................ 427/216; 106/308 Q; 252/62.54; 427/221; 427/248 H

[58] Field of Search ............... 427/216, 248 R, 248 H, 427/213, 221, 127, 220; 252/62.54; 260/2 A, 611 B; 106/308 Q; 428/407

[56] References Cited

U.S. PATENT DOCUMENTS

| | | | |
|---|---|---|---|
| 3,228,881 | 1/1966 | Thomas | 252/62.54 |
| 3,228,882 | 1/1966 | Harle | 252/62.54 |
| 3,385,808 | 5/1968 | Bonin | 106/308 Q |
| 3,401,051 | 9/1968 | Bordenca | 427/216 |
| 3,402,065 | 9/1968 | McDonald | 427/220 |
| 3,451,835 | 6/1969 | Gantel et al. | 106/308 Q |
| 3,607,365 | 9/1971 | Lindlof | 427/213 |
| 3,795,539 | 3/1974 | Di Mino | 252/62.54 |
| 3,892,673 | 7/1975 | Ehrreich | 252/62.54 |
| 3,908,046 | 9/1975 | Fitzpatrick | 427/216 |

*Primary Examiner*—Harry J. Gwinnell
*Assistant Examiner*—S. Silverberg
*Attorney, Agent, or Firm*—Keil, Thompson & Shurtleff

[57] ABSTRACT

A method of stabilizing pyrophoric metal powders by treating the metal powders with alkylene oxides to form a polymer coating on the metal particles.

9 Claims, No Drawings

STABILIZATION OF PYROPHORIC METAL POWDERS WITH ALKYLENE OXIDE POLYMERS

The present invention relates to a method of stabilizing pyrophoric metal powders by treating them with polymer-forming compounds.

For the production of magnetic recording media, ferromagnetic metal powders are increasing in importance. However, these materials which exhibit outstanding magnetic properties have the disadvantage that they are pyrophoric. One of the reasons for this is considered to be the very great fineness of the metal powders with particle sizes from 50 to 2000 A and the resulting large free surface area. Lattice defects have also been discussed as a further cause (cf. Hollemann-Wiberg, Lehrbuch der anorganischen Chemie, 1964, p. 398). It is true that the pyrophoric character of metal powders can be eliminated by heat treatment, but in the case of finely divided metal powders, particularly those composed of acicular particles, heat treatment results in a considerable increase in the particle size due to sintering. However, since the coercive force of ferromagnetic metal powders is at a maximum at particle sizes of from 100 to 500 A and falls off sharply outside this range, the particle size must be kept within the said range to achieve good magnetic properties. As a result, heat treatment is unsuitable for eliminating the pyrophoric character of metal powders.

It is known that pyrophoric metal powders can be stabilized by coating the metal particles with an oxide layer in a controlled oxidation reaction. This can be carried out by passing over the particles an inert gas which only contains a small amount of oxygen at the beginning and whose oxygen content is gradually increased in the course of the reaction (cf. German Published Application No. 2,028,536). Another method of producing a thinner oxide layer on the pyrophoric metal particles is to immerse the metal powder in a solvent containing small amounts of oxygen dissolved therein. After evaporation of the solvent, the sample ceases to be pyrophoric. These processes have the disadvantage that they can only be reproduced with difficulty. Moreover, partial oxidation of the particles decreases the active magnetic component of the metal powder, as a result of which its magnetic properties such as saturation magnetization and remanence are adversely affected.

Attempts have therefore been made to stabilize pyrophoric iron powder by introducing it into a solution of tetraethylene glycol dimethylacrylate in benzene, evaporating the benzene and then producing a polymer coating on the surface of the iron particles by heating, which coating protects the particles against oxidation (cf. M. Robbins, J. H. Swisher, H. M. Gladstone and R. C. Sherwood, J. Electrochen. Soc., 117, 137 (1970)). However, this process is not satisfactory either.

An object of the invention is to provide a method of stabilizing pyrophoric metal powders by means of which such powders can be stabilized in a simpler manner than by conventional processes. A further object of the invention is to provide a stabilization process which does not have an adverse effect on the magnetic properties of the metal powders.

These and other objects and advantages are achieved by a method of stabilizing pyrophoric metal powders by treating the metal powders with polymer-forming compounds to form a polymer coating on the metal particles, wherein alkylene oxides are used as the polymer-forming compounds.

Treatment of the metal powders can be carried out with alkylene oxides in the liquid phase. However, this treatment is carried out particularly advantageously with gaseous alkylene oxides.

Pyrophoric metal powders can be stabilized in a simple manner by the new process, e.g. by passing the gaseous alkylene oxide over or through the metal powder. The process of the invention is particularly suitable for the treatment of ferromagnetic pyrophoric metal powders such as iron powders optionally containing cobalt or nickel.

The pyrophoric metal powders are advantageously produced in a conventional manner by reduction of the appropriate pulverulent metal oxides with a gaseous reducing agent, preferably hydrogen or a hydrogen-containing gas, at temperatures up to 500° C, preferably from 250° to 400° C.

Acicular iron oxides, such as $\alpha$-FeOOH, $\gamma$-$Fe_2O_3$, $Fe_3O_4$ and $\alpha$-$Fe_2O_3$ which may contain, for example, cobalt or nickel are preferably used for the production of acicular ferromagnetic metal pigments which are particularly suitable for magnetic recording applications. The production of such metal pigments is described, for example, in German Published Applications Nos. 2,434,058 and 2,434,096.

Suitable alkylene oxides are generally those containing 2 to 8 carbon atoms, ethylene oxide or propylene oxide being preferred.

The alkylene oxides are preferably used in gaseous form. They may be used in undiluted form or diluted with an inert gas such as nitrogen or argon. Treatment of the metal powder with the alkylene oxide is carried out advantageously at a temperature of from 20° to 250° C and preferably at a temperature of from 40° to 150° C, and generally at atmospheric or superatmospheric pressure. In the latter case pressures of up to 5 atm., preferably up to 1.5 atm., are employed.

Although treatment of the metal powder with the alkylene oxide may be effected in the absence of polymerization catalysts, it is advantageous to employ such catalysts in the conventional manner. Preferred catalysts are Lewis acids or Lewis bases. Gaseous catalysts are preferably employed. An example of a suitable Lewis acid is $BF_3$. Suitable Lewis bases are, for example, ammonia, amines such as alkylamine, and pyridine. The catalysts are usually used in an amount of from 0.01 to 10% by weight and preferably in an amount of from 0.1 to 5% by weight, based on the alkylene oxide. Lewis bases such as amines and particularly ammonia may however be employed in larger amounts, e.g. in amounts up to 100% by weight, based on the alkylene oxide. In this case addition products may form which have a catalytic action. For example, when ethylene oxide and ammonia are used, monoethanolamine, diethanolamine or triethanolamine or mixtures thereof are obtained as catalytically active addition products, depending on the relative proportions of the ethylene oxide and ammonia.

The amount of alkylene oxide required depends on the volumetric density, surface structure and particle size of the metal powder to be treated. The skilled artisan can easily ascertain the amount required for each individual case by carrying out a few experiments. Less alkylene oxide is required when working under superatmospheric pressure. The process of the invention has the advantage that the metal powder can be treated with the alkylene oxide at atmospheric pressure or only slightly superatmospheric pressure. Preferably, more alkylene oxide than is required to produce the polymer coating on the metal particles is employed. The amount of alkylene oxide used is generally from 0.5 to 6 g and preferably from 2 to 4 g per g of metal powder.

One of the disadvantages of prior art methods of producing polymer layers on the particles of ferromagnetic powders is that the layers obtained are frequently too thick, as a result of which the remanence and saturation magnetization are adversely affected. By contrast, relatively thin polymer coatings are formed on the metal particles by the process of the present invention, so that the remanence and saturation magnetization values of the resulting ferromagnetic metal powders are virtually the same as those of untreated pyrophoric ferromagnetic metal powders. A further advantage of the ferromagnetic metal powders obtained by the process of the invention is that they can be dispersed with outstanding ease and are suitable for magnetic recording applications. In contrast to this, in the case of the polymer-coated ferromagnetic metal powders obtained by the prior art processes an undesirable reaction frequently takes place between the protective polymer coating and the binder used in the coating mix, which greatly impairs their dispersibility.

In a preferred embodiment of the process of the invention the pyrophoric metal powder is treated, immediately after its production, with the alkylene oxide, advantageously in the same apparatus as was used for the production of the pyrophoric metal powder, for example a rotary kiln or a fluidized bed reactor. As a result of treating the pyrophoric metal powder in the same apparatus, there is no need to fill the powder into another vessel to stabilize it, and the attendant risk of the metal powder coming into contact with atmospheric oxygen is thus avoided.

It is surprising that the metal pigments obtained by the process of the present invention retain their stability over a sufficiently long period even in a moist atmosphere because polymers of alkylene oxides, e.g. ethylene oxide polymers, are known to be extremely soluble in water. This is shown by the magnetic properties of a stabilized product immediately after production thereof (0), after 24 hours at 25° C and 60% relative humidity (1) and after 24 hours at 25° C and 100% relative humidity (2):

| $H_c$ (kiloamps/m) | $M_m$ (nTm³/g) | $M_r$ | $M_r/M_m$ |
|---|---|---|---|
| 79.4 | 142 | 79 | 0.56 |
| 80.7 | 135 | 77 | 0.57 |
| 79.8 | 110 | 61 | 0.55 |

The symbols used in the foregoing Table and the following Examples have the following meanings:

$H_c$ = coercive force $M_m$ = specific saturation magnetization $M_r$ = specific remanence.

The magnetic properties $H_c$, $M_m$ and $M_r$ were measured with a vibrating-sample magnetometer at a field strength of 160 kiloamps/m.

In the following Examples the effect of the stabilization of the pyrophoric ferromagnetic metal powders was assessed by measuring their magnetic properties. The whole charge was removed from the manufacturing apparatus under nitrogen and measurements were immediately made on a first sample thereof under nitrogen. A second sample of the same charge was first intensely mixed with air at 25° C and 60% relative humidity and then exposed to air for 24 hours at 25° C and 60% relative humidity, the powder being turned several times in the course of the 24-hour period. If, in the subsequent measurements made on the second sample, the remanence was found to be more than 90% of the value of the first sample, the product was considered stable.

EXAMPLE 1

3 g of an acicular pyrophoric iron powder, produced from acicular α-FeOOH by reduction with hydrogen, was treated in a rotary kiln at 120° C with 10 g of ethylene oxide which was introduced in the course of 30 minutes. After cooling, the product was removed under nitrogen, and a sample thereof was found to have the following magnetic properties:

$H_c$ = 80.6 kiloamps/m; $M_m$ = 157; $M_r$ = 88 nTm³/g; $M_r/M_m$ = 0.56.

A second sample was exposed to air for 24 hours at 25° C and 60% relative humidity. After this treatment it was found to have the following magnetic properties:

$H_c$ = 81.1 kiloamps/m; $M_m$ = 142; $M_r$ = 81 nTm³/g; $M_r/M_m$ = 0.57.

EXAMPLE 2

3 g of a pyrophoric iron powder prepared as described in Example 1 was treated at 60° C with 15 g of ethylene oxide which was introduced in the course of 30 minutes.

The magnetic properties of a sample measured under nitrogen were:

$H_c$ = 81.4 kiloamps/m; $M_m$ = 152; $M_r$ = 85 nTm³/g; $M_r/M_m$ = 0.56.

A sample which had been exposed to air for 24 hours at 25° C and 60% relative humidity was found to have the following properties:

$H_c$ = 81.8 kiloamps/m; $M_m$ = 137; $M_r$ = 78 nTm³/g; $M_r/M_m$ = 0.56.

EXAMPLE 3

3 g of a pyrophoric iron powder produced as described in Example 1 was treated at slightly superatmospheric pressure (1.1 atm) and 100° C with 10 g of ethylene oxide and 5 g of ammonia which were introduced in the course of 30 minutes. The product thus obtained was no longer pyrophoric. The magnetic properties of a sample measured under nitrogen were:

$H_c$ = 79.7 kiloamps/m; $M_m$ = 153; $M_r$ = 84 nTm³/g; $M_r/M_m$ = 0.55.

A sample which had been exposed to air for 24 hours at 25° C and 60% relative humidity was found to have the following magnetic properties:

$H_c$ = 80.2 kiloamps/m; $M_m$ = 139; $M_r$ = 77 nTm³/g; $M_r/M_m$ = 0.55.

EXAMPLE 4

3 g of a pyrophoric iron powder prepared as described in Example 1 was treated at 40° C with 6 g of ethylene oxide and 0.1 g of boron, diluted with 15 l of nitrogen, all of which were introduced in the course of 30 minutes. The resulting product was no longer pyrophoric. The magnetic properties of a sample measured under nitrogen were:

$H_c$ = 80.1 kiloamps/m; $M_m$ = 154; $M_r$ = 86 nTm³/g; $M_r/M_m$ = 0.56.

A sample which had been exposed to air for 24 hours at 25° C and 60% relative humidity was found to have the following magnetic properties:

$H_c$ = 80.4 kiloamps/m; $M_m$ = 143; $M_r$ = 80 nTm$^3$/g; $M_r/M_m$ = 0.56.

EXAMPLE 5

3 g of a pyrophoric iron powder produced as described in Example 1 was treated at 120° C under slightly superatmospheric pressure (1.1 atm) with 20 g of propylene oxide which evaporates at about 40° C and had been introduced together with 15 l of nitrogen, as carrier gas, in the course of 30 minutes. The product thus obtained was no longer pyrophoric. The magnetic properties of a sample measured under nitrogen were:

$H_c$ = 79.4 kiloamps/m; $M_m$ = 139; $M_r$ = 79 nTm$^3$/g; $M_r/M_m$ = 0.57.

A sample which had been exposed to air for 24 hours at 25° C and 60% relative humidity was found to have the following magnetic properties:

$H_c$ = 80.0 kiloamps/m; $M_m$ = 129; $M_r$ = 72 nTm$^3$/g; $M_r/M_m$ = 0.56.

We claim:

1. A method of stabilizing a pyrophoric metal powder having particle sizes of from 50 to 2000A which comprises treating the metal powder with from 0.5 to 6g of gaseous alkylene oxide per gram of metal powder to form a polymer coating on the metal particles.

2. A method as set forth in claim 1, wherein the metal powder is treated with the alkylene oxide in the presence of a gaseous catalyst.

3. A method as set forth in claim 1, wherein the metal powder is treated, immediately after its production, with the alkylene oxide.

4. A method as set forth in claim 1, wherein the alkylene oxide has from 2 to 8 carbon atoms.

5. A method as set forth in claim 1, wherein the alkylene oxide is ethylene oxide or propylene oxide.

6. A method as set forth in claim 1, wherein the treatment of the metal powder with alkylene oxide is carried out at a temperature of from 20° to 250° C.

7. A method as set forth in claim 1, wherein the treatment of the metal powder with alkylene oxide is carried out at a pressure of from 1 to 5 atm.

8. A method as set forth in claim 1, wherein the pyrophoric metal powder is a ferromagnetic pyrophoric metal powder.

9. A method as set forth in claim 2, wherein the gaseous catalyst is a Lewis acid or Lewis base.

* * * * *